Dec. 29, 1970 C. A. TOMASZEWSKI ET AL 3,551,904

MEMORY SYSTEM

Filed Feb. 29, 1968 4 Sheets-Sheet 1

PRIOR ART

INVENTORS
CARLOS A. TOMASZEWSKI
TIMOTHY A. R. GOODLIFFE
BY
Lindenberg + Freilich
ATTORNEYS INVENTORS
CARLOS A. TOMASZEWSKI
TIMOTHY A. R. GOODLIFFE
BY
Lindenberg + Freilich
ATTORNEYS

| | | X1 | Y1 | A | B |
|---|---|---|---|---|---|
| WRITE | B (1) | + | + | X | 1 |
| WRITE | A (2) | + | – | 1 | X |
| READ | A (3) | – | + | 0 | X |
| READ | B (4) | – | – | X | 0 |

INVENTORS
CARLOS A. TOMASZEWSKI
TIMOTHY A. R. GOODLIFFE
BY
Lindenberg + Freilich
ATTORNEYS

MEMORY SYSTEM

Filed Feb. 29, 1968 4 Sheets-Sheet 4

| | X1 | Y1 | A | Y2 | B |
|---|---|---|---|---|---|
| | + | + | X | + | 1 |
| WRITE A{ | + | − | 1 | − | X |
| READ A{ | − | + | 0 | + | X |
| | − | − | X | − | 0 |

| X | Y | A | B |
|---|---|---|---|
| + | + | X | 1 |
| + | − | 1 | X |
| − | + | 0 | X |
| − | − | X | 0 |

INVENTORS
CARLOS A. TOMASZEWSKI
TIMOTHY A. R. GOODLIFFE
BY
Lindenberg + Freilich
ATTORNEYS United States Patent Office 3,551,904
Patented Dec. 29, 1970

3,551,904
MEMORY SYSTEM

Carlos A. Tomaszewski, Canoga Park, and Timothy A. R. Goodliffe, Woodland Hills, Calif., assignors to Wyle Laboratories, El Segundo, Calif., a corporation of California Filed Feb. 29, 1968, Ser. No. 709,253
Int. Cl. G11c 7/02
U.S. Cl. 340—174 7 Claims

ABSTRACT OF THE DISCLOSURE

A digital memory system which utilizes a matrix of magnetic elements (e.g., cores) and which has its Y drive wires connected in series pairs to thus reduce the number of Y switch drivers required. A different Y switch driver is associated with each series pair and connected so that an applied Y drive current traverses one of the pair wires in one direction and the other pair wire in the opposite direction. Selection of one of the X drive wires causes a coincident effect at one of the associated cores of the selected Y series pair and an anticoincident effect at the other.

FIELD OF THE INVENTION

This invention relates generally to digital memory systems and more particularly to an improved coincident select magnetic element memory system.

DESCRIPTION OF THE PRIOR ART

The prior art is replete with various coincident select magnetic core memory systems. As an example, in one such known system, a matrix of cores is provided in which three wires thread each core. More particularly, a common sense wire threads all the matrix cores while each of MX drive wires threads a different row of cores and each of NY drive wires threads a different column of cores. To enable selection of one of the MX drive wires, M front end switches are connected to one end of the X drive wires and M rear end switches are connected to the other end of the X drive wires. For example, if the matrix has 64 rows, any one of 64 X wires can be selected by closing 1 of 8 front end X switches and 1 of 8 rear end X switches. Similarly, 1 of 64 Y wires can be selected by closing 1 of 8 front end Y switches and 1 of 8 rear end Y switches.

An object of the present invention is to minimize memory cost by reducing the number of switches required for a particular size memory.

SUMMARY OF THE INVENTION

Briefly, in accordance with the present invention, the number of switches required in a coincident select memory is reduced by connecting the Y drive wires in series pairs so that an applied Y drive current traverses one of the pair wires in one direction and the other pair wire in an opposite direction. As a consequence, a drive current in a selected X drive wire respectively aids and opposes the current in the two wires of the selected Y wire pair to thus have a coincident effect on one of the cores and an anticoincident effect on the other of the cores, at the intersection of the selected X wire and Y series pair.

The novel features of the invention are set forth with particularity in the appended claims. The invention will best be understood from the following description when read in conjunction with the accompanying drawings.

BRIEF DESCRIPTION OF THE DRAWINGS

FIG. 2(*b*) is a schematic diagram illustrating the Y or column selection in a typical prior art coincident select memory;

FIG. 2(*c*) illustrates a typical instruction word format defining an address and a read or write operation;

FIG. 4(*b*) illustrates the format of an instruction word for reading and writing into a memory in accordance with the present invention;

DESCRIPTION OF THE PREFERRED EMBODIMENTS

Figure 1:
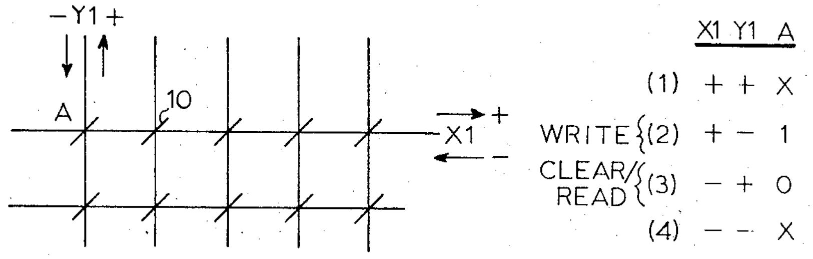
FIG. 1 is a schematic diagram illustrating a typical prior art technique for writing into and reading from a coincident select memory.

Attention is now called to FIG. 1 which illustrates a typical prior art coincident current selection technique. It will be noted that a plurality of column or Y wires are provided which intersect with a plurality of row or X wires. A memory element such as a single aperture magnetic core 10 is disposed at the intersection of each X and Y wire. Consider particularly the core A coupled to the column wire Y1 and the row wire X1. In order to select the core A for either reading or writing, half select currents have to be driven along wires Y1 and X1 in a direction such that they cooperate or aid each other to switch the core A. If the currents along the wires X1 and Y1 effectively oppose each other, then the core A will not change state.

More particularly, let a current along wire Y1 in an upward direction be represented by + and a current in the downward direction be represented by —. Also, let a current to the right in FIG. 1 along row wire X1 be represented by + and a current to the left represented by —. Therefore, four different current conditions can be established at the intersection of wires X1 and Y1 as shown in the table of FIG. 1. Consider case (1) in which the currents along wires X1 and Y1 are both +. Since wires X1 and Y1 both thread the core A, it will be apparent (recall the right hand rule relating current to magnetic field) that they will produce opposite effects in the core A. Thus, the effects will be mutually cancelling and accordingly the core A will not switch. On the other hand, consider case (2) shown in FIG. 1 in which the current along the wire X1 is + and the current along wire Y1 is —. In this situation, the drive currents will aid one another and switch the core A to a first state which is represented by a binary "1" in the table of FIG. 1. Thus, the currents applied to the wires Y1 and X1 as shown in case (2) in FIG. 1 suffice for writing into the core A. Now consider case (3) in which the current along wire X1 is — and the current along wire Y1 is +. In this situation, the currents again aid one another but however have an effect on core A which is opposite to the effect produced in case (2). Thus, the currents represented by case (3) switch the core A to a second state represented by binary "0." Thus, the currents of case (3) can be utilized to either clear or read from core A. With respect to a read operation, a common sense wire (not shown) may thread all of the cores 10. Only the selected core, that is only the core which switches, applies a significant output to the sense winding.

Case (4) illustrated in FIG. 1 refers to currents in a − direction along both wires X1 and Y1. In this situation, as in case (1), the drive currents produce effects which oppose one another and therefore the core A does not switch.

Figure 2A:
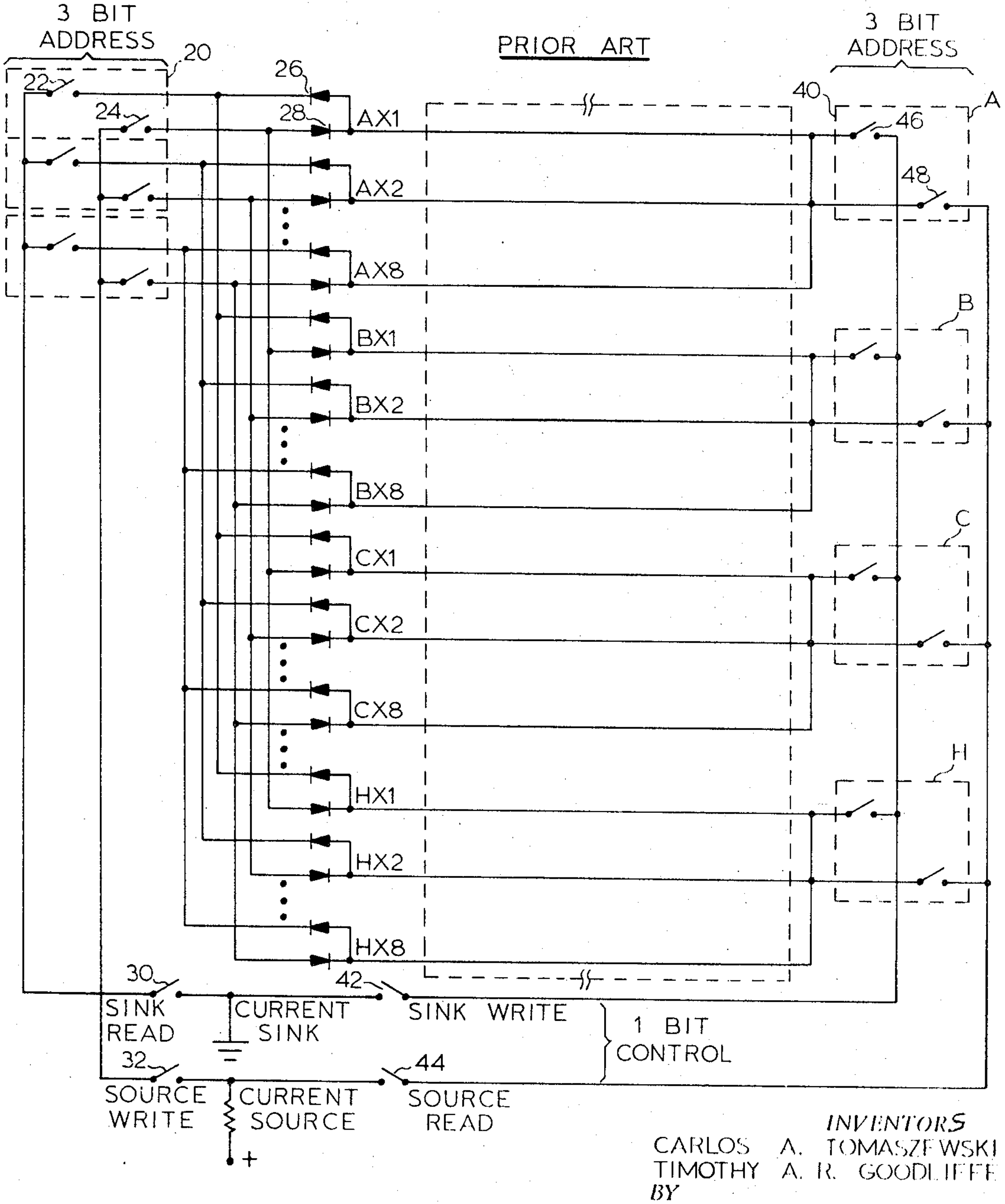
FIG. 2(*a*) is a schematic diagram illustrating the X or row selection in a typical prior art coincident select memory.
Figure 2B:
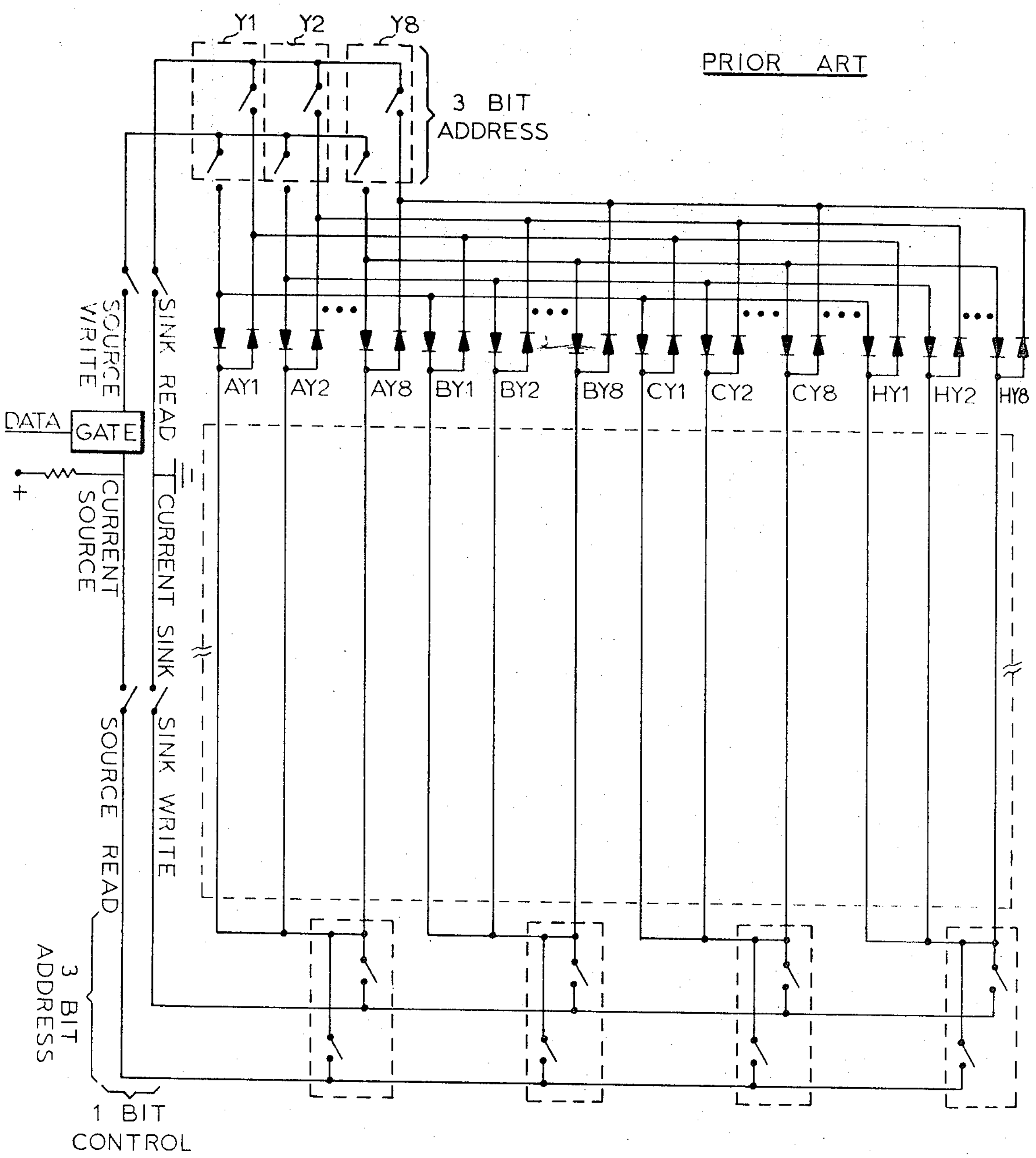
Figure 2C:
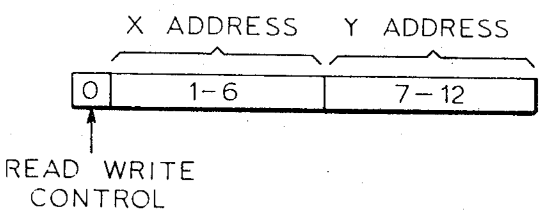

It is again pointed out that the selection technique represented by FIG. 1 is known in the prior art and is utilized in memory systems of the type illustrated in FIGS. 2(*a*) and 2(*b*). FIG. 2(*a*) illustrates a prior art selection technique for the row or X axis. FIG. 2(*b*) illustrates a prior art selection technique for the column or Y axis. As can be seen from FIGS. 2(*a*) and 2(*b*), the selection means for both the X and Y axes can be essentially identical.

In order to simply describe the prior art selection techniques of FIGS. 2(*a*) and 2(*b*), a memory element matrix having 64 rows and 64 columns has been assumed. As shown in FIG. 2(*a*), the 64 row wires are separated into 8 different groups, each group containing 8 wires. Thus, an A group of X drive wires is provided containing wires AX1–AX8. Similarly, a B group of wires is provided comprised of wires BX1–BX8. Likewise, six additional groups of 8 X wires are provided culminating in group H comprised of wires HX1–HX8.

The front or left end (as shown in FIG. 2(*a*)) of each X drive wire is connected to a front end switch 20. Eight different front end switches 20 are provided with each being coupled to a corresponding wire in each of the 8 groups. Thus, switch X1 is associated, and indeed connected to the wire X1 in groups A–H. Each of the switches 20 include switch subsections 22 and 24. Switch subsections 22 and 24 are connected to the drive wires through oppositely poled diodes 26 and 28. In order to select one of the X1 wires, the switch subsections 22 and 24 of switch X1 are closed to respectively connect all of the X1 wires to the sink read switch 30 and source write switch 32. When switch 30 is closed, it connects switch subsection 22 to the current sink (ground) 34. When the source write switch 32 is closed, it connects switch subsection 24 to current source 36.

Thus, it will be appreciated that by closing 1 of the 8 switches 20, a corresponding wire from each of 8 groups is selected. A particular group and thus a particular wire is selected by also selecting one of the rear end or group switches 40. Each group switch 40 connects the rear or right end of a group of wires to a sink write switch 42 and a source read switch 44. More particularly, each switch 40 includes switch subsections 46 and 48. When a group switch is selected, e.g., group A, the switch subsections 46 and 48 of that switch close to thus connect the right end of the wires of the selected group to the switches 42 and 44.

One of 8 front end switches 20 is defined by three address bits. Similarly, 1 of 8 group switches 40 is selected by three address bits. A single control bit can control switches 30, 32, 42 and 44. FIG. 2(*c*) illustrates a typical instruction word format. It will be apparent that bit 0 of the instruction word shown in FIG. 2(*c*) defines the operation (write or clear/read) to be performed and is used to control switches 30, 32, 42 and 44. Bits 1 through 6 control the selection of 1 of the 8 switches 20 and 1 of the 8 switches 40 to thus select a particular X wire.

The column or Y wire selection, shown in FIG. 2(*b*) is substantially identical to the row or X wire selection shown in FIG. 2(*a*). The only difference between the Y selection means of FIG. 2(*b*) and the X selection means of FIG. 2(*a*) aside from the 90° difference in orientation, is that gate 50 is included in the Y selection means to permit writing at the selected memory element depending upon the data input applied to line 52. That is, if binary "1" data bit is to be written, then when the writing operation occurs the gate 50 is enabled to permit a current to flow on the selected Y drive wire. On the other hand, if a "0" data bit is to be written, then the data input information applied to line 52 disables gate 50. One of the 64 Y wires in FIG. 2(*b*) is selected by six address bits, i.e., bit 7–12 of the instruction word shown in FIG. 2(*c*).

In the operation of the prior art memory of FIGS. 2(*a*) and 2(*b*), in order to select a particular memory element for reading and writing, appropriate address information has to be provided to select the X and Y wires threading the particular core to be selected. If a write operation is to be performed, then the source write switches of both FIGS. 2(*a*) and 2(*b*) are closed. Additionally, both sink write switches are also closed. This action provides a drive current to the right along the selected X wire. Additionally, a downward current would be provided along the selected Y wire assuming of course that gate 50 is enabled by a "1" bit to be written appearing on line 52. Thus, the current directions along the X and Y wires corresponds to that previously discussed in connection with FIG. 1. Similarly, if a read operation is to be performed, then the sink read switch 30 and source read switch 44 of FIG. 2(*a*) are closed along with the corresponding switches of FIG. 2(*b*). This will cause a current to the left along the selected X wire and a current upward along the selected Y wire. This corresponds to case (3) illustrated in FIG. 1.

From the description of the prior art system of FIGS. 2(*a*) and 2(*b*), it will be apparent that 8 different switches 20 and 8 different switches are required to select any one of the 64 X wires. Similarly, 8 different front or top end switches and 8 different bottom or rear end switches are required to select one of the 64 Y wires in FIG. 2(*b*).

Figure 3:
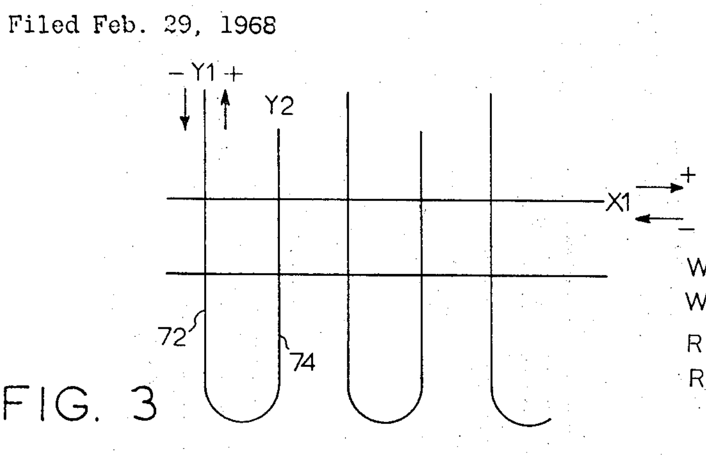
FIG. 3 is a schematic diagram illustrating a selection technique in accordance with the present invention.

Attention is now called to FIG. 3 which illustrates a selection technique in accordance with the present invention which reduces the number of switches required as compared to a prior art system of the type illustrated in FIGS. 2(*a*) and 2(*b*). In accordance with the invention as represented by FIG. 3, the Y drive wires are connected in series pairs. Thus, the lower end 72 of wire Y1 is looped around and connected to the lower end 74 of wire Y2. In order to understand the operation of a memory constructed as represented in FIG. 3, assume core A to be threaded by row wire X1 and column wire Y1 and core B to be threaded by row wire X1 and column wire Y2. Further assume the same polarity nomenclature as that used in FIG. 1. That is, a current vertically downward along wire Y1 is represented by − and a current vertically upward by +. Similarly, a current to the right along row wire X1 is represented by + and a current to the left by −. The table of FIG. 3 illustrates that with the currents in wires X1 and Y1 both +, core A will not switch. This agrees with the conclusion reached in FIG. 1. However, note that if the current is + or vertically upward in wire Y1, then that same current will be vertically downward in wire Y2. A downward current in wire Y2 aids the + current in wire X1 thereby switching the core B to a "1" state.

With respect to case (2) illustrated in FIG. 3, it will be apparent that core A will operate as described in FIG. 1. It should also be apparent, however that with the current in wire Y2 downward and the current in wire X1 to the right, the currents would cancel one another as far as core B is concerned. Case (3) represented in the table of FIG. 3 shows that core A will again act as in FIG. 1 and that core B will fail to switch. With respect to case (4), core A will fail to switch, as described in connection with FIG. 1. However, core B will switch to a "0" state inasmuch as the upward current in wire Y2 and the current in wire Y2 and the current to the left in wire X1 will aid one another to switch the core B to the "0" state.

From the explanation of FIG. 3, it should be apparent that a pair of Y wires can operate from the same switch. Thus, a memory system in accordance with FIG. 3 can utilize fewer switches than are employed in the system of FIGS. 2(*a*) and 2(*b*). Alternatively, of course, a larger capacity memory can be constructed in accordance with the teachings of FIG. 3 utilizing the same number of switches as shown in FIGS. 2(*a*) and 2(*b*). This latter situation is presented in FIG. 4(*a*) which illustrates the column or Y axis select means for a matrix comprised of 128 columns in 64 rows. It will be appreciated that such a matrix is twice the size of the matrix assumed in the system of FIGS. 2(*a*) and 2(*b*). However, it will further be appreciated from FIG. 4(*a*) that the same number of Y select switches are utilized in FIG. 4(*a*) as are utilized in FIG. 4(*b*). More particularly, 8 different front end switches 80 are utilized in FIG. 4(*a*). Each switch 80 corresponds to a different wire in each of the 8 groups A–H. Each switch 80 includes switch subsections 82 and 84 which are respectively connected through oppositely poled diodes to the front end of a first wire of a serially connected pair of wires. Switch subsection 82 connects the front or upper end of the Y wire to a source write switch 86. Switch subsection 84 connects the front ends of the Y wires to a sink read switch 88.

Figure 4A:
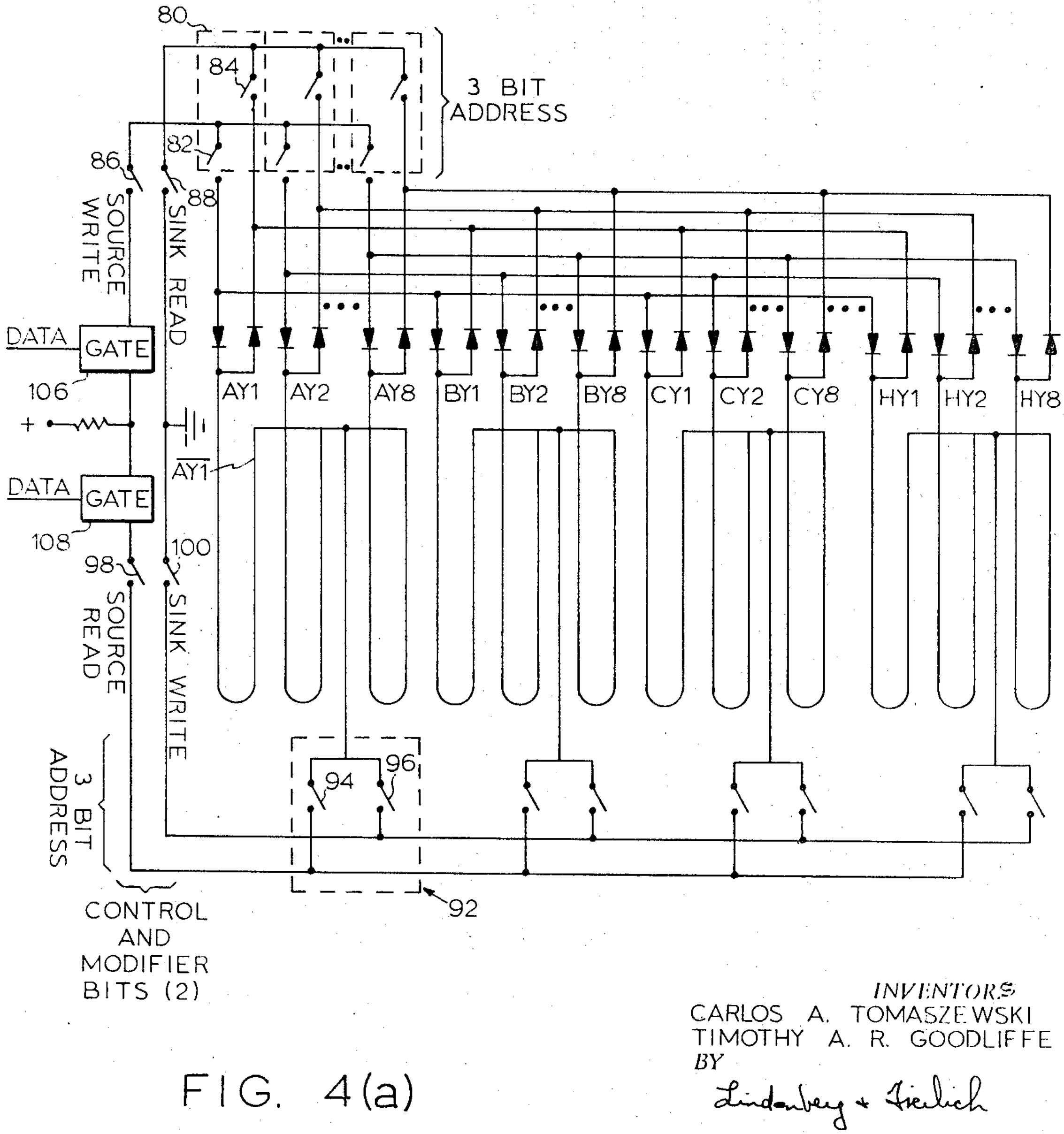
FIG. 4(*a*) is a schematic illustrating the Y or column selection employed in a coincident select memory in accordance with the present invention.
Figure 4B:
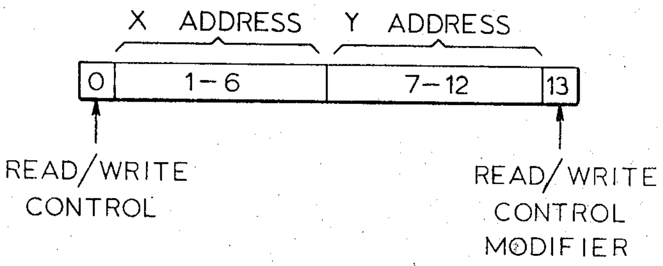

It will be noted in FIG. 4(*a*) that the lower end of wire AY1 is connected to the lower end of another wire which will be referred to as $\overline{AY1}$. The upper end of each of the $\overline{Y}$ wires of group A is connected to the group A lower or rear end switch 92. Switch 92 is comprised of subsections 94 and 96 which respectively connect the upper ends of the $\overline{Y}$ wires to source read switch 98 and sink write switch 100.

It is pointed out that the Y select means of FIG. 4(*a*) can be used with the X select means as shown in FIG. 2(*a*). As shown by the instruction word format of FIG. 4(*b*), the first seven bits of the instruction word can be identical to the instruction word of FIG. 2(*c*). Additionally, bit 7–12 representing the Y address in the instruction word of FIG. 4(*b*) can likewise be identical to bit 7–12 of the instruction word of FIG. 2(*c*). The instruction word of FIG. 4(*b*) however requires an additional bit 13 to indicate whether the Y wire being selected is the left wire of the pair, e.g., AY1, or the right wire $\overline{AY1}$. If the right wire of the pair is being selected, then the read and write switches 86, 88, 98 and 100 are operated in an opposite manner. That is, it will be recalled from FIG. 3 that in order to write into core A, or for that matter, into any core coupled to the left wire of a wire series pair, the conditions represented by case (2) are established. However, in order to write into core B or any core coupled to the right wire of a series pair, the conditions of case (1) were established. Case (1) differs from case (2) in that the direction of current in the Y wire is reversed. Thus, if a write operation is to be performed as represented by the bit in the 0 position of the instruction word of FIG. 4(*b*) and if a right wire of a series pair is designated by bit 13, then bit 13 is additionally interpreted to modify and reverse the read write control. More particularly, if a write operation is to be performed and a right wire of a series pair is selected, then the source read switch 98 and sink read switch 88 are closed. This, of course, will cause a downward current in the right wire of the series pair and an upward or positive current in the left wire thereby defining case (1) in the table of FIG. 3. From the foregoing explanation, it will be recognized that the source read switch 98 will effectively operate as the source write switch whenever information is to be written into a right wire of a series pair. Consequently, means must be provided for gating current to the switch 98 dependent upon the state of the data bit. For this purpose, FIG. 4(*a*) shows gates 106 and 108 respectively connected to switches 86 and 98. Each of gates 106 and 108 are controlled by the data bit to be written. Although gates 106 and 108 have, for simplicity, been illustrated as separate elements, it will be appreciated that they can from part of a common gating circuit and indeed can form part of the same gating circuit (not shown) responsive to the control bits for controlling switches 86, 88, 98 and 100.

Clearing or reading of core B of FIG. 3 is accomplished by case (4) as distinguished from case (3) in FIG. 3. Therefore, if a read operation is to be performed and bit 13 defines a right wire of a series pair, then the source write switch 86 and the sink write switch 100 are closed.

Figure 5:
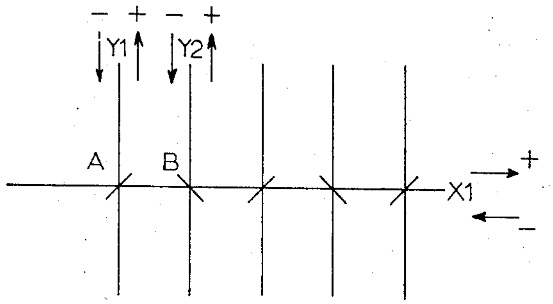
FIG. 5 is a schematic diagram similar to FIG. 1 but illustrating a noise reduction technique employed in the prior art.

It is pointed out that in the description of the memories of the prior art and of the invention as shown in FIGS. 1 and 3, all of the cores were identically oriented. In order to minimize noise considerations, the core orientations of most practical memories are more often alternated as shown in FIG. 5. It will be apparent from the table also shown in FIG. 5 that the alternating orientations do not raise any significant problems and it is merely necessary to reverse the polarity of the currents in wire Y2 as compared to wire Y1.

Figure 6:
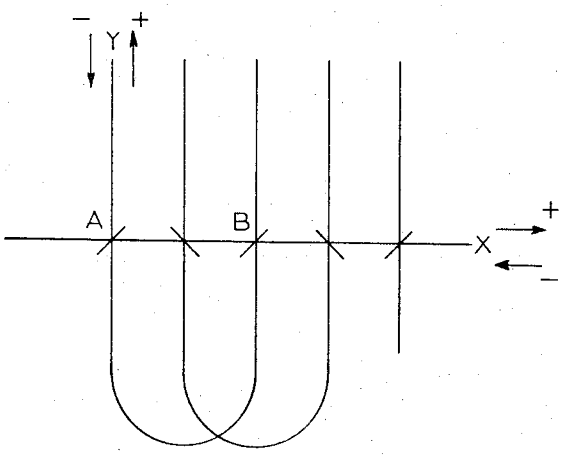
FIG. 6 is a schematic diagram illustrating the manner of using the noise reduction technique of FIG. 5 in a system constructed in accordance with the present invention.

FIG. 6 illustrates that the teachings of the present invention can be utilized equally as well in a memory matrix in which the core orientations are alternated to reduce noise. In the arangement of FIG. 6, however, the series pairs are interleaved so that the cores A and B are coupled to different wires of a common series pair are oriented in the same manner.

From the foregoing, it should be appreciated that an improved coincident select memory organization has been disclosed herein which, for a memory of a particullar size, requires fewer switch drivers than similar prior art memory systems. Alternatively, as has been demonstrated herein, a 128 x 64 memory can be provided utilizing the same number of switch drivers as is utilized in a 64 x 64 memory known in the prior art. It is pointed out that although the switching circuits have been represented herein as simplified electro-mechanical switches, they of course would in most applications constitute transistor switching circuits. Such circuits are well known in the art and need not be discussed in detail here.

Although particular embodiments of the invention have been described and illustrated herein, it is recognized that modifications and variations may readily occur to those skilled in the art and consequently it is intended that the claims be interpreted to cover such modifications and equivalents.

We claim:

1. A digital memory system comprising:

a plurality of memory elements arranged in rows and columns;

a plurality of X drive wires each coupled to the elements of a different one of said rows;

a plurality of Y drive wires each coupled to the elements of a different one of said columns;

means interconnecting parts of said Y drive wires in series;

a plurality of X switch means equal in number to said X drive wires and each actuatable to uniquely select one of said X drive wires;

a plurality of Y switch means equal in number to one-half of said Y drive wires and each actuatable to uniquely select one of said interconnected pairs of Y drive wires; and means for driving a current in both directions through the wires of said selected pair.

2. The memory system of claim 1 wherein said interconnecting means couples one end of a first Y wire to a like end of a second Y wire whereby a current applied to the free end of one Y wire of a selected pair will respectively flow in opposite directions through said first and second Y wires.

3. The memory system of claim 1 including a sense wire coupled to each of said elements.

4. The memory system of claim 1 wherein each of said elements comprises a single aperture magnetic core.

5. The memory system of claim 1 wherein said interconnecting means couples one end of a first Y wire to a like end of a second Y wire whereby a current applied to the free end of either Y wire of a selected pair will respectively flow in opposite directions through said first and second Y wires.

6. The memory system of claim 5 including means for driving a current in a selected direction through a selected one of said X drive wires so as to respectively aid and oppose the currents in the first and second wires of said selected pair.

7. The memory system of claim 5 wherein said means for driving a current includes a current source means and a current sink means;

means for selectively coupling said current source means to the free end of one of said first or second Y wires; and means for selectively coupling said current sink means to the free end of the wire to which said source means is not coupled.

References Cited

UNITED STATES PATENTS 3,146,426 8/1964 Agon et al. -------- 340—174

STANLEY M. URYNOWICZ, Jr., Primary Examiner